(12) United States Patent
Gemme et al.

(10) Patent No.: US 7,897,873 B2
(45) Date of Patent: Mar. 1, 2011

(54) COMMUNICATIONS CABLES HAVING OUTER SURFACE WITH REDUCED COEFFICIENT OF FRICTION AND METHODS OF MAKING SAME

(75) Inventors: Christopher Paul Gemme, Hickory, NC (US); George W. Bollinger, Jr., Claremont, NC (US)

(73) Assignee: CommScope Inc. of North Carolina, Hickory, NC (US)

(*) Notice: Subject to any disclaimer, the term of this patent is extended or adjusted under 35 U.S.C. 154(b) by 262 days.

(21) Appl. No.: 12/369,952

(22) Filed: Feb. 12, 2009

(65) Prior Publication Data

US 2010/0200270 A1 Aug. 12, 2010

(51) Int. Cl.
*H01B 7/00* (2006.01)
(52) U.S. Cl. ............ 174/110 R; 174/113 R
(58) Field of Classification Search ........ 174/110 R, 174/110 FC, 11 R, 113 C, 115, 116, 36
See application file for complete search history.

(56) References Cited

U.S. PATENT DOCUMENTS

| | | | | |
|---|---|---|---|---|
| 5,245,134 A | * | 9/1993 | Vana et al. | 174/117 F |
| 5,606,151 A | * | 2/1997 | Siekierka et al. | 174/113 R |
| 5,744,757 A | * | 4/1998 | Kenny et al. | 174/113 R |
| 5,841,072 A | * | 11/1998 | Gagnon | 174/110 F |
| 6,008,455 A | * | 12/1999 | Lindstrom et al. | 174/117 F |
| 6,222,129 B1 | * | 4/2001 | Siekierka et al. | 174/113 R |
| 6,441,308 B1 | * | 8/2002 | Gagnon | 174/105 R |
| 7,154,043 B2 | * | 12/2006 | Clark | 174/113 R |
| 7,244,893 B2 | * | 7/2007 | Clark | 174/113 R |
| 7,271,343 B2 | * | 9/2007 | Clark | 174/113 R |
| 7,276,664 B2 | * | 10/2007 | Gagnon | 174/105 R |
| 7,317,163 B2 | * | 1/2008 | Lique et al. | 174/113 C |
| 2002/0139559 A1 | | 10/2002 | Valls Prats | |

* cited by examiner

*Primary Examiner*—William H Mayo, III
(74) *Attorney, Agent, or Firm*—Myers Bigel Sibley & Sajovec, P.A.

(57) ABSTRACT

A communications cable is made by providing at least one conducting element, and co-extruding first and second polymeric materials around the at least one conducting element to form a dielectric jacket encasing the at least one conducting element. The at least one conducting element may include at least one electrical conductor, and/or at least one optical fiber. The dielectric jacket has a substantially constant cross-sectional configuration along a length of the cable and comprises an inner layer formed from the first polymeric material and an outer layer formed from the second polymeric material. The outer layer has an outer surface with a coefficient of friction within the range of about 0.05-0.40, and a thickness of between about five and ten thousandths of an inch (0.005"-0.010").

23 Claims, 2 Drawing Sheets

COMMUNICATIONS CABLES HAVING OUTER SURFACE WITH REDUCED COEFFICIENT OF FRICTION AND METHODS OF MAKING SAME

FIELD OF THE INVENTION

The present invention relates generally to communications systems and, more particularly, to communications cables.

BACKGROUND

Many businesses have dedicated communications systems that enable computers, servers, printers, facsimile machines and the like to communicate with each other, through a private network, and with remote locations via a telecommunications service provider. In, for example, commercial office buildings, the dedicated communications system may be hard wired using communications cables that contain conductive wire. In such hard wired systems, individual connector ports such as modular wall jacks are mounted in offices throughout the building. Communications cables are run through, for example, the walls and/or ceiling of the building to electrically connect each connector port to network equipment (e.g., network servers) that are located in, for example, a telecommunications closet or computer room. Communications cables from external telecommunication service providers may also terminate within the computer room or telecommunications closet.

Communications cables, such as twisted pair cables, typically are used to interconnect computers, peripherals and network equipment. Twisted pair cables typically include multiple (e.g., four) pairs of insulated conductors that are housed within a common cable sheath. Typically, each conductor comprises an insulated copper wire. The conductors may be formed of a larger single strand of copper or of a plurality of smaller copper strands that are twisted together. The conductors of each pair of conductors in a twisted pair cable are twisted together, typically with different "twist lengths", which is defined as a distance wherein the wires of a twisted wire pair twist about each other one complete revolution. The pairs of conductors may also be twisted together within a cable so as to have a "core twist."

FIG. 1 illustrates a conventional twisted pair cable, designated generally by the numeral 10. Individual conductors 12 are comprised of conducting material 13 (e.g., copper, aluminum, or alloys thereof, etc.) surrounded by insulating material 14. Conductors 12 are twisted together to form twisted pairs 16. Pairs 16 are enclosed in an insulating jacket 17 to form multi-pair cable 10. Shown in a cross sectional view in FIG. 2, it is seen that many of the individual conductors lie adjacent to other conductors in different pairs.

Communications cables, such as the twisted pair cable 10 of FIGS. 1-2, are typically routed through the walls, ceilings and/or floors of buildings with other cables in close proximity. In fact, multiple cables are typically bundled together using cable ties to facilitate routing of the cables through the walls, ceilings and floors. The exterior surface of the jacket of conventional communications cables typically has a high coefficient of friction. As a result, conventional communications cables may not slide easily when in contact with other cables and objects. This is particularly true if cable ties are applied therearound to provide a tight bundle of cables. Thus, conventional communications cables can be difficult to position, particularly at equipment headends and cable trays where multiple cables are located together in close proximity to each other and where tight bends may exist.

Electrical wiring used in residential and commercial buildings is often pulled through walls and other structures. To reduce frictional resistance of walls and the like when pulling electrical wiring therethrough, U.S. Patent Application Publication No. 2002/0139559 proposes spraying lubricating material onto the outer surface of electrical wiring. Unfortunately, spraying lubricant onto communications cables can hinder electrical connectors attached thereto. The lubricant may create ridges and other discontinuities that can keep connectors from fitting properly on a communications cable.

SUMMARY

According to some embodiments of the present invention, a communications cable is made by providing at least one conducting element, and co-extruding first and second polymeric materials around the at least one conducting element to form a dielectric jacket encasing the at least one conducting element. The at least one conducting element may include at least one twisted pair of electrical conductors, and/or at least one optical fiber. In some embodiments, the communications cable is a coaxial cable with a central conductive element. The dielectric jacket has a substantially constant cross-sectional configuration along a length of the cable and comprises an inner layer formed from the first polymeric material and an outer layer formed from the second polymeric material. In some embodiments of the present invention, the outer layer has an outer surface with a static coefficient of friction within the range of about 0.04-0.40, and a thickness of between about five and ten thousandths of an inch (0.005"-0.010").

In some embodiments of the present invention, exemplary materials for the first polymeric material include, but are not limited to, polyolefins, polyamides, polyurethanes and polyvinyl chlorides. Exemplary materials for the second polymeric material include, but are not limited to, fluoroethylenepropylene (FEP), ethylenechlorotrifluoroethylene (ECTFE), perfluoroalkoxy polymers (PFA), polytetrafluoroethylene (PTFE), and ethylene tetrafluoroethylene (ETFE).

Other communications cables and methods of making same according to exemplary embodiments will be or become apparent to one with skill in the art upon review of the following drawings and detailed description. It is intended that all such additional cables and methods be included within this description, be within the scope of the present invention, and be protected by the accompanying claims.

DETAILED DESCRIPTION

Figure 1:
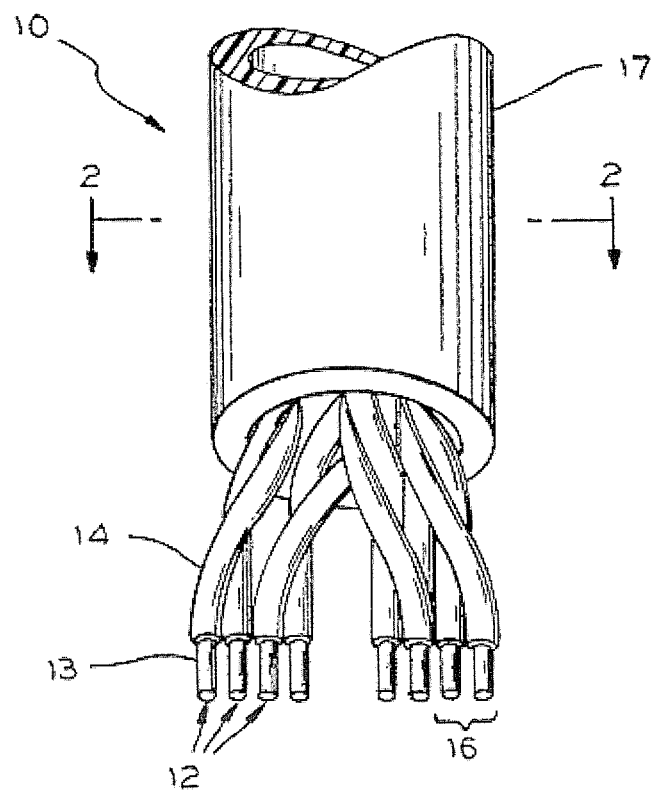
FIG. 1 is a perspective view of a conventional communications cable, such as a twisted pair cable.
Figure 2:
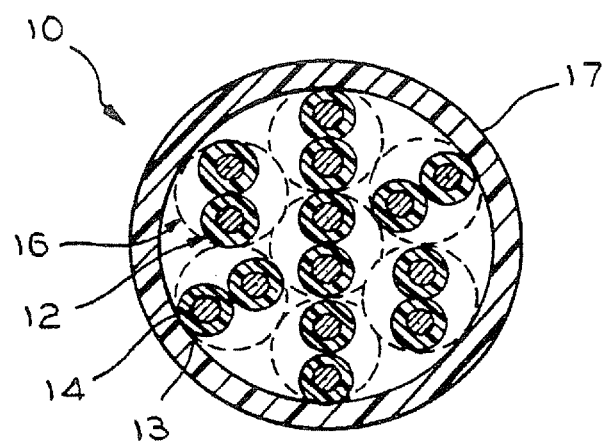
FIG. 2 is a cross-sectional view along lines 2-2 of the cable shown in FIG. 1.

The present invention now is described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/". As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present.

It will be understood that, although the terms "first", "second", etc. may be used herein to describe various elements, components, etc., these elements, components, etc. should not be limited by these terms. These terms are only used to distinguish one element, component, etc. from another element, component, etc. Thus, a "first" element or component discussed below could also be termed a "second" element or component without departing from the teachings of the present invention. In addition, the sequence of operations (or steps) is not limited to the order presented in the claims unless specifically indicated otherwise.

The term "communications cable", as used herein, is intended to include any type of cable having one or more conducting elements, that conduct electricity or light, surrounded by a protective sheath or jacket. Communications cables, according to embodiments of the present invention, include, but are not limited to, twisted pair cables, optical fiber cables, coaxial cables, and/or any combinations thereof. Communications cables, according to embodiments of the present invention, also may include insulation material, separators, and/or strength members, etc.

Embodiments of the present invention provide communications cables having co-extruded skins of material with reduced coefficients of friction, and methods of making the same. According to some embodiments of the present invention, a method of making a communications cable includes providing at least one elongated conducting element, and co-extruding first and second polymeric materials around the at least one conducting element to form a dielectric jacket encasing the at least one conducting element. As known to those of skill in the art, co-extrusion involves extruding two or more materials through a single die with two or more orifices arranged so that the extrudates merge and weld together into a laminar structure before cooling. Each material is fed to the die from a separate extruder, but the orifices may be arranged so that each extruder supplies two or more plies of the same material.

The at least one conducting element may include at least one electrical conductor, at least one twisted pair of insulated electrical conductors, and/or at least one optical fiber. An electrical conductor may be formed of a single, solid elongated metal strand, or from a plurality of metal strands that are twisted or otherwise held together. In some embodiments, the communications cable is a coaxial cable with a central conductive element. Embodiments of the present invention are particularly advantageous for CAT5, CAT5E, CAT6 and CAT6A cable installations where bundles of cables are often utilized. As known to those of skill in the art of the present invention, such cables contain multiple twisted pairs of insulated copper wire.

The co-extrusion process is performed such that the dielectric jacket has a substantially constant cross-sectional configuration along a length of the cable and comprises an inner layer formed from the first polymeric material and an outer layer formed from the second polymeric material. In some embodiments of the present invention, the outer layer has an outer surface with a static coefficient of friction within the range of about 0.04-0.40, and a thickness of between about five and ten thousandths of an inch (0.005"-0.010"). The substantially constant cross-sectional configuration facilitates alignment and attachment of connectors to end portions of the communications cable.

The jacket of a communications cable, according to embodiments of the present invention, may have a substantially circular cross-sectional configuration, a substantially rectangular cross-sectional configuration, etc. Various cross-sectional configurations are possible, and embodiments of the present invention are not limited to communications cables with circular or rectangular cross-sectional configurations.

In some embodiments of the present invention, exemplary materials for the first polymeric material include, but are not limited to, polyolefins, polyamides, polyurethanes and polyvinyl chlorides. For example, the first polymeric material may be a low-cost material, e.g., black high density polyethylene (HDPE). Because the inner layer is completely surrounded by the outer layer, the first polymeric material may be a lower cost material and/or may have various properties, such as a high coefficient of friction that would not be suitable as the outer layer of material. Moreover, the first material may have a different color from the second polymeric material. Exemplary materials for the second polymeric material include, but are not limited to, fluoroethylenepropylene (FEP), ethylenechlorotrifluoroethylene (ECTFE), perfluoroalkoxy polymers (PFA), polytetrafluoroethylene (PTFE), and ethylene tetrafluoroethylene (ETFE). In some embodiments, the first and/or second polymeric materials may include filler materials including, but not limited to, materials having flame retardant and/or smoke suppressing properties.

Figure 3:
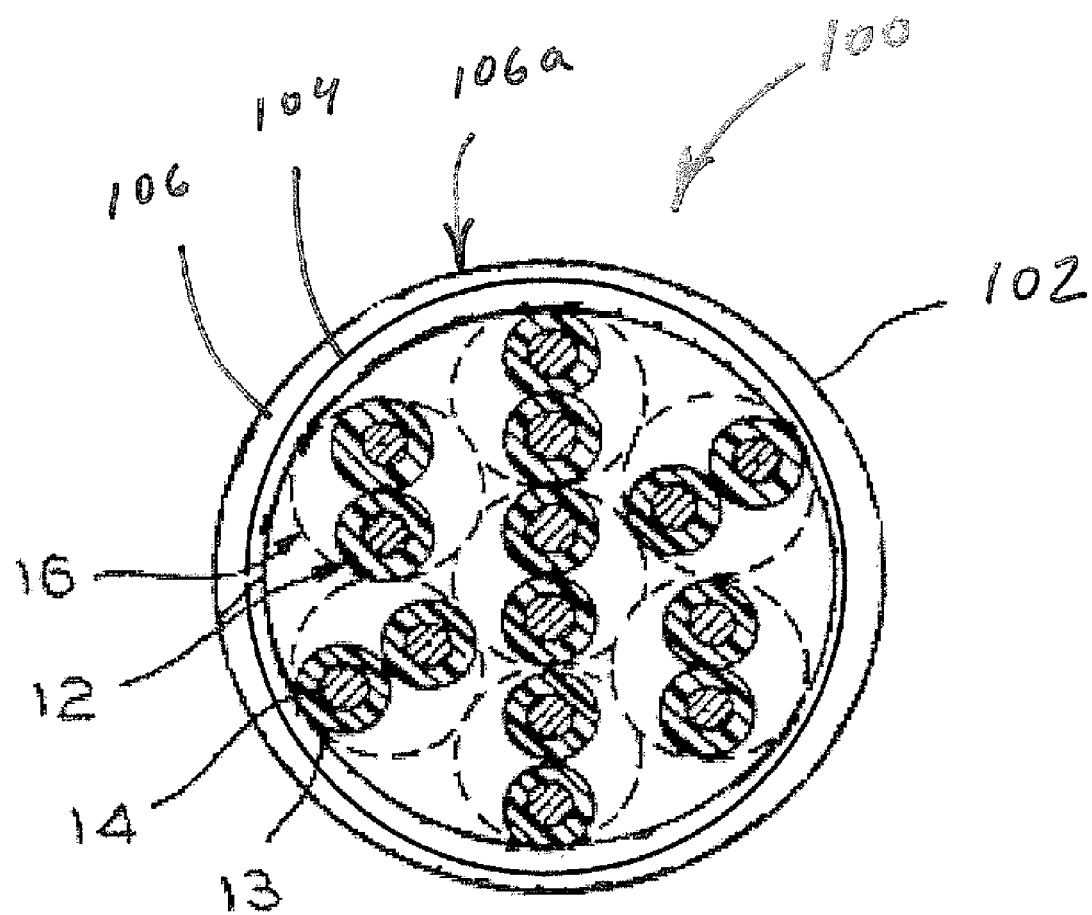
FIG. 3 is a cross-sectional view of a communications cable according to some embodiments of the present invention.

Referring to FIG. 3, a communications cable 100, according to some embodiments of the present invention, is illustrated. The illustrated communications cable 100 includes a plurality of conducting elements 12 twisted together to form twisted pairs 16. A dielectric jacket 102 encases the twisted pairs 16 to form a multi-pair cable (e.g. a CAT5, CAT6 cable) 100. The dielectric jacket 102 includes an inner layer 104 of a first polymeric material and an outer layer 106 of a second polymeric material. As described above, exemplary materials for the first polymeric material include, but are not limited to, polyolefins, polyamides, polyurethanes and polyvinyl chlorides, and exemplary materials for the second polymeric material include, but are not limited to, FEP, ECTFE, PFA, PTFE, and ETFE. The jacket 100 has a substantially constant cross-sectional configuration along a length of the cable, and the outer layer 106 has a thickness of between about five and ten thousandths of an inch (0.005"-0.010") and has an outer surface 106*a* with a coefficient of friction of between about 0.05-0.40.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A communications cable, comprising:
   at least one conducting element; and
   a dielectric jacket encasing the at least one conducting element, wherein the dielectric jacket comprises an inner layer of a first polymeric material selected from the group which includes polyolefins, polyamides, polyurethanes and polyvinyl chlorides, and an outer layer of a second polymeric material selected from the group which includes fluoroethylenepropylene (FEP), ethylenechlorotrifluoroethylene (ECTFE), perfluoroalkoxy polymers (PFA), polytetrafluoroethylene (PTFE), and ethylene tetrafluoroethylene (ETFE), wherein the jacket has a substantially constant cross-sectional configuration along a length of the cable, and wherein the outer layer has a thickness of between about five and ten thousandths of an inch (0.005"-0.010") and has an outer surface with a coefficient of friction of between about 0.05-0.4.

2. The communications cable of claim 1, wherein the first polymeric material comprises high density polyethylene (HDPE) having a first color, and wherein the second polymeric material has a second color different from the first color.

3. The communications cable of claim 1, wherein the communications cable is bundled with a plurality of additional communications cables.

4. The communications cable of claim 1, wherein the first and/or second polymeric materials comprise filler material.

5. The communications cable of claim 4, wherein the filler material comprises material having flame retardant and/or smoke suppressing properties.

6. A method of making a communications cable, comprising:
   providing at least one conducting element; and
   co-extruding first and second polymeric materials around the at least one conducting element to form a dielectric jacket encasing the at least one conducting element, wherein the jacket has a substantially constant cross-sectional configuration along a length of the cable and comprises an inner layer formed from the first polymeric material and an outer layer formed from the second polymeric material, wherein the outer layer has an outer surface with a static coefficient of friction of between about 0.04-0.40.

7. The method of claim 1, wherein the jacket has a substantially circular cross-sectional configuration.

8. The method of claim 1, wherein the first polymeric material is selected from the group which includes polyolefins, polyamides, polyurethanes and polyvinyl chlorides, and wherein the second polymeric material is selected from the group which includes fluoroethylenepropylene (FEP), ethylenechlorotrifluoroethylene (ECTFE), perfluoroalkoxy polymers (PFA), polytetrafluoroethylene (PTFE), and ethylene tetrafluoroethylene (ETFE).

9. The method of claim 1, wherein the first polymeric material comprises high density polyethylene (HDPE).

10. The method of claim 1, wherein the first polymeric material has a first color, and wherein the second polymeric material has a second color different from the first color.

11. The method of claim 1, wherein the outer layer has a thickness of between about five and ten thousandths of an inch (0.005"-0.010").

12. The method of claim 1, wherein the at least one conducting element comprises at least one twisted pair of insulated conductors.

13. The method of claim 1, wherein the at least one conducting element comprises at least one optical fiber.

14. The method of claim 1, wherein the first and/or second polymeric materials comprise filler material.

15. The method of claim 14, wherein the filler material comprises material having flame retardant and/or smoke suppressing properties.

16. A method of making a communications cable, comprising:
    providing at least one conducting element; and
    co-extruding first and second polymeric materials around the at least one conducting element to form a dielectric jacket encasing the at least one conducting element, wherein the jacket has a substantially constant cross-sectional configuration along a length of the cable and comprises an inner layer formed from the first polymeric material and an outer layer formed from the second polymeric material, wherein the outer layer has a thickness of between about five and ten thousandths of an inch (0.005"-0.010") and has an outer surface with a static coefficient of friction of between about 0.04-0.40, wherein the first polymeric material is selected from the group which includes polyolefins, polyamides, polyurethanes and polyvinyl chlorides, and wherein the second polymeric material is selected from the group which includes fluoroethylenepropylene (FEP), ethylenechlorotrifluoroethylene (ECTFE), perfluoroalkoxy polymers (PFA), polytetrafluoroethylene (PTFE), and ethylene tetrafluoroethylene (ETFE).

17. The method of claim 16, wherein the jacket has a substantially circular cross-sectional configuration.

18. The method of claim 16, wherein the first polymeric material comprises high density polyethylene (HDPE).

19. The method of claim 16, wherein the first polymeric material has a first color, and wherein the second polymeric material has a second color different from the first color.

20. The method of claim 16, wherein the at least one conducting element comprises a plurality of twisted pairs of insulated conductors.

21. The method of claim 16, wherein the at least one conducting element comprises at least one optical fiber.

22. The method of claim 16, wherein the first and/or second polymeric materials comprise filler material.

23. The method of claim 22, wherein the filler material comprises material having flame retardant and/or smoke suppressing properties.

* * * * *

UNITED STATES PATENT AND TRADEMARK OFFICE
CERTIFICATE OF CORRECTION

| | | |
|---|---|---|
| PATENT NO. | : 7,897,873 B2 | Page 1 of 1 |
| APPLICATION NO. | : 12/369952 | |
| DATED | : March 1, 2011 | |
| INVENTOR(S) | : Gemme et al. | |

It is certified that error appears in the above-identified patent and that said Letters Patent is hereby corrected as shown below:

Column 5, Claim 7, Line 66: Please correct "claim 1" to read -- claim 6 --

Column 6, Claim 8, Line 1: Please correct "claim 1" to read -- claim 6 --
Claim 9, Line 9: Please correct "claim 1" to read -- claim 6 --
Claim 10, Line 11: Please correct "claim 1" to read -- claim 6 --
Claim 11, Line 14: Please correct "claim 1" to read -- claim 6 --
Claim 12, Line 17: Please correct "claim 1" to read -- claim 6 --
Claim 13, Line 20: Please correct "claim 1" to read -- claim 6 --
Claim 14, Line 22: Please correct "claim 1" to read -- claim 6 --

Signed and Sealed this
Nineteenth Day of July, 2011

David J. Kappos
*Director of the United States Patent and Trademark Office*